July 25, 1939.  H. R. ADAMS  2,166,935

TEMPERATURE CHANGE COMPENSATION APPARATUS

Filed Aug. 8, 1936

INVENTOR
Hurl R. Adams
By C. P. Byrnes
His attorney

Patented July 25, 1939

2,166,935

UNITED STATES PATENT OFFICE 2,166,935

TEMPERATURE CHANGE COMPENSATION APPARATUS

Hurl R. Adams, Pittsburgh, Pa.

Application August 8, 1936, Serial No. 94,946

8 Claims. (Cl. 171—95)

This invention pertains to electrical measuring, and more particularly, to new and improved devices for standardizing or calibrating. It also pertains to temperature change compensation and/or to temperature measurement.

There has always been a need for some standard by which electrical potential and/or current could be established and maintained, and more recently, by which physical properties related thereto could be measured and/or compared. An example of the latter need is found in the measurement of temperature by determining the electromotive force produced by a thermocouple.

Previous to the present invention, the standard or cadmium cell has been employed as the known standard of potential or E. M. F. with which unknown potentials were compared by the well known "potentiometer method". This cell was chosen since it supplies a potential more nearly constant than other chemical cells. However, it has a temperature coefficient of potential, has a loss of potential with age, is very expensive, and has an internal voltage drop. Since the terminal voltage of the cell differs from its E. M. F. by the IR drop due to its resistance, it is evident that if any appreciable current is taken from the cell that its terminal voltage will be quite different from its E. M. F. And as a result, the cell can only be used when it delivers no appreciable current.

And, it has been an object of my invention to provide a commercially practical standard that will make possible discarding the standard cell with its inherent limitations.

Another object has been to provide improved apparatus for establishing a desired electrical value.

A further object has been to devise an electrical testing apparatus that will be accurate over wide ranges of ambient temperature.

A still further object has been to provide a current standard by a balanced bridge method.

A still further object has been to provide a more positive, sensitive, efficient and/or effective electrical measurement standard.

In one aspect my invention deals with the discovery than a standard cell can be eliminated and that it is possible to provide a current standard that may be effectively employed to produce and maintain a voltage standard.

In another aspect, my invention pertains to the measurement of physical properties, such as temperature, in terms of electrical quantities. It also pertains to compensating for or balancing out an electromotive force variation set up by a change of cold junction temperature such as arises in connection with the determination of temperature by the thermo-electric effect at the junction of two dissimilar metals (thermocouple).

These and many other objects and aspects of my invention will appear to those skilled in the art from the description, the drawing, and the claims. In the drawing—

Figure 1:
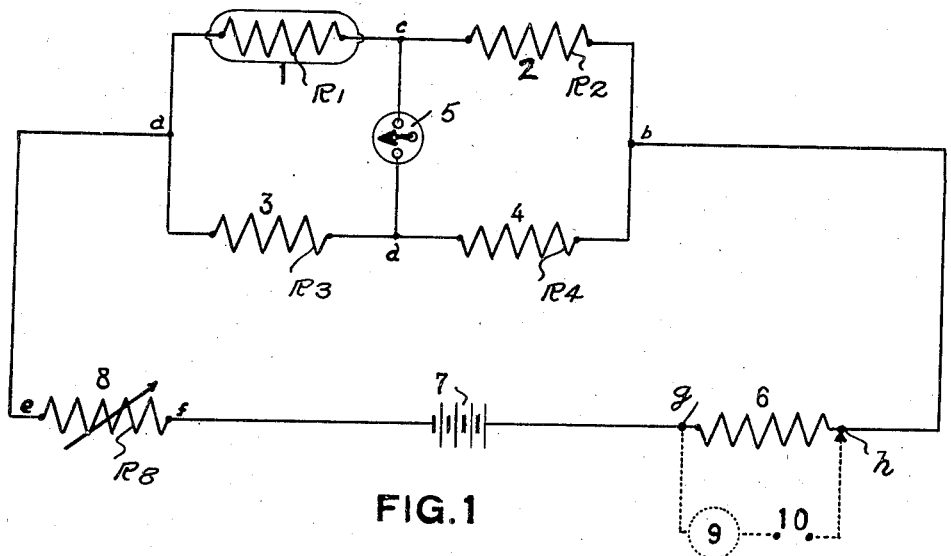
Figure 1 is a circuit representation or layout of a system employing features of my invention.
Figure 3:
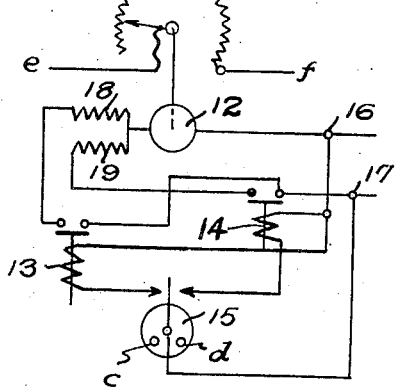
Figure 2:
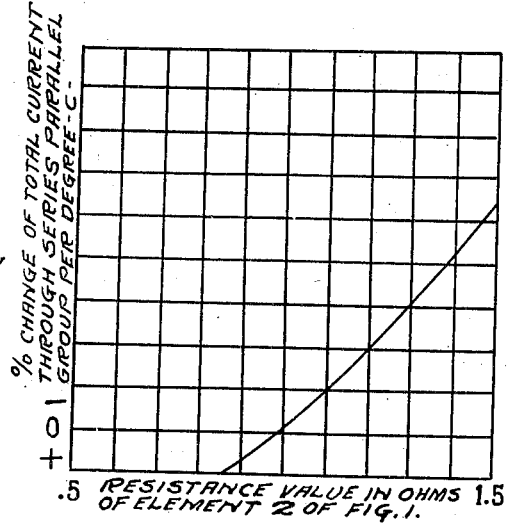

Figure 2 is a curve plotted to show a preferable resistance value of a unit such as 2 for producing a certain percentage change of current flow when the circuit constants are those indicated in the example hereinafter set forth for the purpose of illustrating my invention. In the curve, the ordinate represents the percentage change of total current flow per degree C., and the abscissa represents the resistance value in ohms of the element 2 of Figure 1 in a particular application hereinafter described; and Figure 3 is a diagrammatic representation of an electrical layout that may be employed for automatically indicating and/or controlling balanced conditions in the circuit arrangement of Figure 1.

I have developed a balanced bridge circuit arrangement such that a desired predetermined current flow may be established and maintained in a closed circuit in such a manner that its value will always be known during the testing of an unknown, and whereby such measurements may be made exceptionally accurate. The circuit arrangement may be employed as a current standard that will be accurate even when the arrangement is subjected to temperature changes, and especially, to changes of ambient temperature.

Another application of my invention is in connection with the translation of changes of temperature, and especially, changes of ambient temperature, into electrical quantities that may be indicated in terms of a certain percentage current change.

I have employed my invention to compensate ambient temperature changes of the cold junction of a thermo-couple by changes of current through and potential across a resistance, such as a potentiometer. This current change results from the same change of ambient temperature of the series parallel group that affects the cold junction; this current change produces a voltage change across the resistance that automatically balances out the variation of thermo-couple voltage.

I have also employed my invention to set up current changes in a resistance, such as a potentiometer, in such a manner than the resultant voltage changes in the resistance will be determined by changes of ambient temperature and will balance out voltage changes set up by variations in voltage caused by changes of cold junction temperature of a thermocouple.

My invention deals with current temperature translation and/or with the provision of a desired current flow in a closed circuit irrespective of physical changes that may occur in the elements of the circuit and irrespective, in general, of variables that might otherwise affect the current flow. Broadly speaking, I have been able to so control and/or translate physical changes, and more specifically, resistance changes in elements, that those changes can either be rendered null in effect or can be employed to accomplish some desired result.

I preferably employ a series-parallel group of resistances in an arrangement such that the proportionate relations of a Wheatstone bridge circuit may be employed. The bridging device is connected between the series resistances junctions of the parallel groups, and preferably is a "bridge-balance", indicating device such as a galvanometer. The resistance characteristics of the resistance elements are proportioned in such a manner that the potential across the bridging device will preferably be indicated by a zero deflection of a galvanometer if a desired and/or predetermined value of current flows through the group and through the connected circuit. The circuit preferably includes a series connected source of current and a current-adjusting device, such as a rheostat. If the circuit is to be employed to establish a voltage standard, calibrated resistances such as those of a potentiometer will also be connected in series in the circuit.

I have so selected the resistance elements of the group and/or designed their resistance characteristics, that a change of current will be indicated by the bridge-balance indicating device. The desired current flow is re-established by either manually or automatically adjusting the rheostat until the galvanometer or "bridge-balance" indicating device again reads zero. And, whether the circuit arrangement or layout is employed to provide a predetermined or desired current, or to provide a desired change of current with change of ambient temperature, the bridge reading should be zero as controlled in such a manner as above indicated.

Figure 1A:
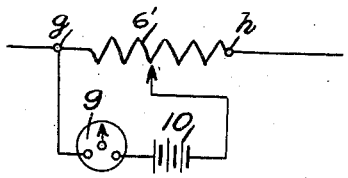
Figure 1A is a supplementary circuit representation for testing an unknown.

Referring specifically to Figure 1, the numerals 1, 2, 3 and 4 represent resistance elements of the series-parallel group that is connected at terminals $a$ and $b$ in a closed circuit comprising a series connected rheostat 8, source of current 7 and calibrated resistance 6 or 6′, see Figure 1A. A voltage balancing circuit indicated by dotted lines is shown connected across the potentiometer resistance 6; this circuit includes a galvanometer 9 and terminals 10 for connecting an unknown electromotive force. It will be apparent that if the current flow through potentiometer resistance 6 is maintained at a known value that the voltage drop per unit resistance of the potentiometer wire will also be known and that when the slide connected to the unknown and potentiometer resistance has been adjusted until the galvanometer 9 reads zero, that the voltage drop across the unknown 19 can be read from the potentiometer resistance 6; the two E. M. F.'s being equal and opposite. This is a simple application of establishing and maintaining a predetermined current for voltage standard requirements and illustrates one of the many applications of my invention.

A galvanometer 5 is connected between the terminals $c$—$d$ to provide "bridge-balance" indications.

In Figure 3, I have shown an automatic arrangement for re-establishing a zero deflection of the "bridge-balance" indicating galvanometer and thus, for re-balancing the resistance group 1, 2, 3 and 4. A contact-making galvanometer 15 is connected between terminals $c$—$d$ in place of or with galvanometer 5 and is employed to establish a current flow through relay 13 when the deflection is in one direction and to establish a current flow through relay 14 when the deflection is in the opposite direction; this arrangement takes care of positive and negative deflections, corresponding to an increase or decrease of the total current from the value desired. The lines 16 and 17 provide a source of power for a reversible motor 12, an electromagnetic device (such as a solenoid), or other suitable device, and for exciting the relays 13 and 14. The motor 12 drives the variable arm of rheostat 11 that may be connected between terminals $e$—$f$ of the circuit of Figure 1 in place of, or in combination with the manually controlled rheostat 8.

Referring particularly to Figure 3, it will be apparent that a deflection of the galvanometer 15 to the right will cause energization of relay 14 and consequently a connection of power line 17 to the field winding 19 of motor 12; this produces a rotation of the motor in one direction and a consequent movement of the arm of the resistance 11 in such a direction. In like manner, a deflection of the galvanometer to the left energizes the coil of relay 13 and produces a connection between the line 17 and coil 18 of the motor 12; this produces a revolution of the motor 12 in an opposite direction and a consequent movement of the variable arm of the resistance 11 in the same direction.

Although I have described the arrangement of Figure 3 employed in connection with the circuit of Figure 1 for its automatic control, a contact galvanometer has other applications.

It will be apparent from the above description that this closed circuit arrangement of Figure 1 in itself provides a current standard, and when employed with a calibrated resistor such as the coils and/or slide wire of a potentiometer 6, also provides a standard of potential, fixed or variable as desired.

In accordance with the principles of my invention, the equation—

(1) $R1 \times R4 = R2 \times R3$ will hold true when the "bridge-balance" indicator shows the existence of no potential difference between the points $c$—$d$, Figure 1, where a galvanometer 5 is the bridge-balance indicator.

In carrying out my invention, I control the proportions involved in Equation (1) by varying the current supplied to a series parallel group of resistors, some or all of which have temperature coefficients of resistance. Of course the variation of current supplied to a series-parallel group 1, 2, 3 and 4 is controlled in such a manner that the reading of the galvanometer 5 will always remain at a desired value such as zero. This is accomplished by adjusting resistance 8, which is a variable resistance or rheostat. Expressed in another manner, the voltage or potential difference between points $c$—$d$ and hence across the bridging device, will be maintained at zero and no current will flow through the bridging device. And, if the device is the galvanometer 5, it will read zero, indicating that the series-parallel group is "bridge-balanced".

In order to better describe my invention and the principles upon which its operation depends, I will hereinafter set forth the circuit relationships that I have successfully employed in the series-parallel group for the purposes previously enumerated.

It is known that the temperature coefficient of resistance of a metal or alloy is characteristic of that metal or alloy and of its temperature condition. Let us consider a drawn tungsten filament, or wire, mounted preferably in a vacuum. Tungsten normally has a positive temperature coefficient of resistance. If reasonable care is taken in the preparation of the tungsten wire, and in the assembly and evacuation of the unit, and if the operating temperature of the tungsten wire is kept below that value at which evaporation takes place at an appreciable rate, it will be apparent that at a certain temperature T the tungsten unit will have a resistance R.

Let it be assumed that with no current flowing in the above mentioned tungsten unit that the temperature of the unit is 0° C. To raise the temperature of the unit from 0° C. to some temperature T, and to maintain the unit at that temperature T requires that energy be expended in the unit. This energy we will assume to be supplied by a current I, that passes through the tungsten wire. If, on the other hand, it is assumed that the original or ambient temperature of the tungsten resistor unit is 20° C. instead of 0° C., it is evident that the rate of energy expenditure necessary to raise the unit and maintain it, at the temperature T will be less than in the first case, and if the energy in the second case is also supplied by an electric current flowing through the tungsten wire, that the value of the current required in the second case will be less than the value of current required in the first case. Therefore, the current I necessary to maintain the unit at a temperature T decreases with an increase of the ambient temperature of the unit. Since, under the operating conditions that have been specified, the resistance R of the unit is always the same at the temperature T, the resistance R is maintained by a current which decreases in value with an increase of the ambient temperature of the unit.

If the tungsten unit described above is employed as resistor 1, in the series-parallel group of resistors, Figure 1, and the other three resistance arms, 2, 3 and 4 are made from materials having negligible temperature coefficients of resistance, it is apparent that the current flowing in the unit 1 and the ambient temperature of the unit will be factors involved in bringing the relation of Equation (1) into effect.

Assuming the bridge potential difference between c—d to be maintained at zero by constant adjustment of the rheostat 8 while the ambient temperature of the unit is being varied:

(1). The current in R1=the current in R2.

(2) The current in the R1, R2 branch decreases with an increase of ambient temperature.

(3) The potential difference across the branch R1, R2 decreases with an increase of ambient temperature, since to bring the bridge back to balance, rheostat 8 is adjusted in such a manner that R1 and R2 then have their original resistance values, and—

(4) The voltage drop across the branch R3, R4 also decreases (being in parallel with branch R1, R2), causing a decrease in the current in the branch R3, R4 with the given increase of the ambient temperature, producing a cumulative decrease of the total current flowing through the series-parallel circuit with an increase of the ambient temperature.

It will appear from the above explanation that the utilization of three resistance arms having negligible temperature coefficients of resistance in combination with one such as tungsten which has a temperature coefficient, makes possible the provision of a desired range of scale of current values in a circuit in accordance with ambient temperature changes. It will also appear that the above enumerated conditions are obtained by suitable regulation or adjustment of the resistance 8 to decrease the current (when R1 has a positive temperature coefficient) in the series parallel circuit and to thereby compensate for the increased resistance of R1 with an increase of temperature.

It is apparent from Equation (1) that if one or both of the resistors R2, R3, has a positive temperature coefficient of resistance, the product $R2 \times R3$ will also increase with ambient temperature, and for the equation to again hold true the value of the product $R1 \times R4$ must rise to satisfy the equality stated in the equation. This increase in $R1 \times R4$ is effected by adjusting the control rheostat 8 until the bridge again is in balance, at which condition, since Equation (1) again holds true—

The value of R1 has been increased the necessary amount by an increase of the temperature of the tungsten wire above the original temperature T by the flow of a higher value of current in the branch R1, R2, and this higher value of current is accompanied by a higher potential difference across the arms R1, R2, R3, R4. This higher potential difference results in a higher value of current in the arm R3, R4; all these factors tend to cumulatively counteract the condition found to exist in the first case where only one of the arms of the series-parallel group has a temperature coefficient of resistance.

From the above explanation, it will be apparent that it is possible to counteract the tendency of the current through the bridge and the closed circuit to decrease with an increase of ambient temperature as outlined in the first example where only one of the bridge elements such as 1, has an appreciable temperature coefficient of resistance by employing for some or all of the resistors of a series-parallel group resistors having temperature coefficients of resistance, values which are determined by the current temperature characteristics desired. By the characteristics desired, I have particular reference to the provision of a desired predetermined current or to a desired change of current for a change of ambient temperature.

It is thus possible by proper design to maintain a given current as long as the rheostat 8 is adjusted at all times so that the galvanometer or birdge-balance indicator 5 indicates the bridge to be balanced, and the following two sets of conditions may be had:

(a) A current may be provided that is constant and independent of ambient temperature changes of the resistors in the series-parallel group.

(b) A current will be provided which will change in a predetermined manner with a change of ambient temperature of the series-parallel group. This change may either be a positive or negative change with respect to ambient temperature change, as determined by the design and application of the particular arrangement.

As shown in Figure 2, the above claimed effects may be produced in actual practice. This curve represents the percent change of total current flowing through the series-parallel group, per degree centigrade, when the ohmic values of the resistor unit 2 are those represented on the abscissa of the curve, and when the values of the other arms of the series-parallel group are those values listed below, the ambient temperature varying from 0° C. to 25° C. The curve of Figure 2 shows that by employing values in resistance arm 2 as indicated on the abscissa, in connection with the values of the other three arms listed below, it is possible to so design the series-parallel group of resistors that, keeping the potential difference c—d at zero by adjustment of the rheostat 8, as mentioned before, the total current through the series-parallel group of resistors may be made to increase, decrease, or remain constant with change of ambient temperature.

The values employed in the arrangement for the data plotted in Figure 2 are as follows:

Resistor 1=0.0003" diameter tungsten wire mounted in a highly evacuated chamber. Resistance of 15 ohms at 25° C.
Resistor 2=No. 35, B. S., enameled copper wire having the ohmic resistance indicated by the abscissa of the graph.
Resistor 3=154.3 ohms of manganin wire.
Resistor 4=8.1 ohms of manganin wire.

For the set of conditions above outlined, the series-parallel group or regulator a—b may be set to balance when there is substantially 10 m. a. of current through the regulator and the closed circuit.

In conducting the test for determining the data from which this curve was plotted, the only values changed were those of the resistor 2 and the ambient temperature, which latter was varied from 0° C. to 25° C. Changing only the value of the resistor 2, caused a change in the total current for which the bridge balanced. The curve indicates the percent variation of the total bridge current per degree C. change of ambient temperature, and it is apparent from the information given that it is possible to design the bridge resistors in such a manner that the desired rate of change of the total bridge current with temperature and the magnitude of the current will be the values desired.

Thus, it is desirable to select a resistance for the unit 2 such that the curve of Figure 2 will cross the zero axis when the arrangement is to be employed for constantly supplying a predetermined current. And, when the arrangement is to be employed to provide a potential variation for counter-balancing a potential variation caused by variations of the cold junction temperature of a thermocouple, the resistance of the unit 2 should be selected so that the current change is indicated by the negative portion of the curve of Figure 2.

When it is desired to positively indicate or to utilize a current change to indicate an ambient temperature change so as to regulate some heat conditioning unit for example, it may be desirable to select a resistance of the unit 2 so that the curve of Figure 2 will operate on either the plus or minus portion. From the above description, it is apparent that I have provided a current standard which, when placed in series with an electric circuit will indicate a known current in the circuit, and that the value of the known current will be determined by the design of the resistor units of the series-parallel group. The indications will be provided by the galvanometer or balance indicating device when balanced relationship is being maintained by adjusting a current control rheostat or other device in the circuit.

It is apparent from the information given that the bridge resistors may be designed so that any desired total current value through the bridge will cause the bridge to balance, and that the change of current at the condition of balance may be either dependent on or independent of a change of ambient temperature.

I have indicated a few of the many applications of the present invention, but it will be apparent to those skilled in the art that many others may be readily provided. I have also successfully employed the above described arrangement as a current standard suitably calibrated against direct current standards, and have then successfully used it as a standard for both direct and alternating currents.

The circuit arrangement of Fig. 1 was chosen for simplicity in disclosing the principles of my invention. It is apparent to any person familiar with the art that in place of the source 7 and the controlling rheostat 8, there may be substituted a variable source of potential such as a voltage divider rheostat, variable potential generator, etc.

It is of course apparent that the specific materials above enumerated have been chosen for the purpose of illustration, and that other suitable resistance materials can be employed.

While I have described several embodiments and applications of this invention, it will be apparent that many changes, substitutions, modifications, additions and omissions, or combinations thereof may be made in connection therewith, without departing from the spirit and scope of the invention as indicated by the appended claims.

I claim:

1. In a system for indicating ambient temperatures in terms of an electrical quantity, a vacuum enclosed tungsten resistance element, a copper wire resistance element, said tungsten and copper elements being connected in series and forming a branch of a Wheatstone bridge circuit, said circuit having suitable resistance in its other branches, the temperature coefficients and resistance values of the circuit being proportioned in such a manner that the potential difference at the junction between said tungsten and copper elements and between the connection between resistances of the other branch of the circuit is zero when the device is calibrated, and means for restoring the potential difference to a zero value when the resistances are subjected to changes of ambient temperature, which, in turn, changes the resistance values of said tungsten and copper elements, said system being constructed and arranged to provide a constant desired current value irrespective of changes in ambient temperature when a condition of zero potential at the junction is maintained by said last-mentioned means.

2. In an electrical apparatus for maintaining a desired current in a circuit at a substantially constant value during changes of ambient temperature, a source of current, a rheostat for adjusting the current value in accordance with the working range of the apparatus, a calibrated potentiometer of known potential per unit of resistance, and a series-parallel group of resistance branches, said rheostat, potentiometer and resistance group being connected in series with said source of current and forming a circuit, a galvanometer bridged across said group, each resistance of said group having desired temperature coefficients and ratios of resistance to each other, said galvanometer always indicating by zero deflection that the desired current is present in the circuit, and means for adjusting said rheostat to re-establish balanced conditions indicated by the zero deflection reading of said galvanometer when said group is subjected to changes of ambient temperature.

3. A regulator unit comprising four resistors divided into pairs of two, the two resistors of each pair being connected in series, and each pair being connected in parallel with the other pair, the resistances of one pair being of a known value, and the resistances of the other pair being of such a value that the potential difference between the junction of the resistors of the pairs is always the same when there is a desired current through the series-parallel group, at least one of said resistances being temperature sensitive for changing the current in accordance with changes of ambient temperatures, said resistance being a wire having a high temperature coefficient of resistance and being preferably vacuum enclosed.

4. In a system for establishing and obtaining current of a desired value in an electrical circuit subject to changes in temperature and/or of current supplied by a source to the circuit, a group of resistances connected and proportioned to provide a desired value of current, a source of current for the group, an indicator means connected to said group for indicating a desired proportioned relationship of said resistances, and means operably arranged with respect to said group, said means being constructed and arranged to reproportion effective resistance values of said group to a desired relationship as indicated by said indicator where the original proportioned relationship has been upset by a change of temperature and/or change of current supplied by said source.

5. In a system as defined in claim 4, said last-mentioned means being a means for automatically proportioning effective resistance values of said group.

6. In a system for establishing and obtaining current of a desired value in an electrical circuit subject to changes in its characteristics, a series-parallel connected group of resistances, a current source therefor, an indicator means connected across said group for indicating a desired current provided by a desired proportioned relationship of said resistances at a given ambient temperature, and means connected to said group, said last-mentioned means being constructed and arranged to provide current of a desired value for a given temperature while the proper conditions therefor are determined by said indicator.

7. In a system for establishing and providing a current of a desired value in an electrical circuit subjected to temperature variations, a series-parallel connected group of resistances in the circuit, a source of current for the circuit, an indicator means connected across said group for indicating a desired condition of said group by a zero potential reading, a variable resistance operably and electrically connected with said source and said group, a voltage indicator electrically connected to said group, said variable resistance being constructed and arranged to provide a constant desired value of current in said voltage indicator means as determined by a zero potential reading of said indicator irrespective of changes of temperature and/or of changes of current supplied by said source.

8. A regulator unit comprising four resistors divided into pairs of two, the two resistors of each pair being connected in series, and each pair being connected in parallel with the other pair, one resistor being sensitive to changes in ambient temperature, another resistor being sensitive to changes in ambient temperature and current, said resistors being proportioned and connected and having values such that the potential difference between the junction of the resistors of the pairs is the same irrespective of changes in ambient temperature when there is a desired current through the series-parallel group.

HURL R. ADAMS.